United States Patent [19]

Wall, Jr. et al.

[11] Patent Number: 5,675,575
[45] Date of Patent: Oct. 7, 1997

[54] METHOD AND APPARATUS FOR COMMUNICATING DIFFERENT TYPES OF DATA IN A DATA STREAM

[75] Inventors: William Edgar Wall, Jr., Atlanta; Jay Cauthern McMullan, Jr., Doraville; Luis Agustin Rovira, Atlanta, all of Ga.

[73] Assignee: Scientific-Atlanta, Inc., Norcross, Ga.

[21] Appl. No.: 421,889

[22] Filed: Apr. 14, 1995

Related U.S. Application Data

[63] Continuation of Ser. No. 171,453, Dec. 22, 1993, abandoned, which is a continuation of Ser. No. 56,560, May 3, 1993, Pat. No. 5,406,558, which is a division of Ser. No. 618,744, Nov. 27, 1990, Pat. No. 5,239,540.

[51] Int. Cl.$^6$ ............................................. H04J 3/00
[52] U.S. Cl. .................... 370/326; 370/321; 370/345; 370/487; 370/498
[58] Field of Search .......................... 370/110.1, 71, 370/73, 77, 94.1, 522, 430, 464, 389, 478, 486, 321, 345, 487, 498; 358/342, 332, 335; 380/10, 19, 20; 455/45, 46, 158.4, 158.5, 186.1, 186.2

[56] References Cited

U.S. PATENT DOCUMENTS

| | | | |
|---|---|---|---|
| 3,696,297 | 10/1972 | Otero | 325/55 |
| 3,743,767 | 7/1973 | Bitzer et al. | 178/5.6 |
| 3,757,225 | 9/1973 | Ulicki | 325/308 |
| 3,936,595 | 2/1976 | Yanagimachi et al. | 178/5.6 |
| 4,052,719 | 10/1977 | Hutt et al. | 340/324 |
| 4,079,419 | 3/1978 | Siegle et al. | 358/193 |
| 4,203,130 | 5/1980 | Doumit et al. | 358/1 |
| 4,305,101 | 12/1981 | Yarbrough et al. | 360/69 |
| 4,323,922 | 4/1982 | den Toonder et al. | 358/117 |
| 4,390,901 | 6/1983 | Keiser | 358/147 |
| 4,390,986 | 6/1983 | Moses | 370/99 |
| 4,488,179 | 12/1984 | Kruger et al. | 358/181 |

(List continued on next page.)

FOREIGN PATENT DOCUMENTS

| | | | |
|---|---|---|---|
| 3146466 A1 | 9/1983 | Germany | H04H 5/00 |
| 52-48428 | 4/1977 | Japan | H04N 5/00 |
| 68-227195 | 9/1988 | Japan | H04Q 9/00 |
| 2166328 | 4/1986 | United Kingdom | H04H 1/02 |
| 2207314 | 1/1989 | United Kingdom | H04N 7/00 |
| WO84/01873 | 5/1984 | WIPO | H04H 7/10 |
| WO88/045407 | 6/1988 | WIPO | H04N 7/087 |

OTHER PUBLICATIONS

E. Bryan Carne, "The Wired Household", IEEE Spectrum, Oct. 1979, 61–66.

G.A. McKenzi, "Oracle—An Information Broadcasting Service Using Data Transmission In the Vertical Interval", Journal of the SMPTE, Jan. 1974, 6–10.

(List continued on next page.)

Primary Examiner—Douglas W. Olms
Assistant Examiner—Shick Hom
Attorney, Agent, or Firm—Banner & Witcoff, Ltd.

[57] ABSTRACT

An apparatus and method is described for transmitting, receiving and communicating program data signals which are combined with digital data signals. Preferably, the present invention compresses 30 digital audio signals, multiplexes them with title, track, artist, record label, year, etc., program information, and transmits the combined signals via satellite to a receiving station. The receiving station demultiplexes the signals and sends them via a cable distribution system to a subscriber's digital music tuner. This tuner further demultiplexes and decodes the signals so that the digital audio signals may be converted to analog and output for listening, while the corresponding data signals are communicated to the subscriber. In an alternative preferred embodiment, the program data signals are transmitted to a remote control receiver where they are displayed. The system described in the present invention may be used for transmitting video, software or games with program data to subscribers.

15 Claims, 8 Drawing Sheets

U.S. PATENT DOCUMENTS

| | | | |
|---|---|---|---|
| 4,605,793 | 8/1986 | Von Kohorn | 358/335 |
| 4,613,901 | 9/1986 | Gilhousen et al. | 380/21 |
| 4,623,887 | 11/1986 | Welles, II | 340/825.57 |
| 4,672,606 | 6/1987 | Bourgonje et al. | 370/85 |
| 4,682,360 | 7/1987 | Frederiksen | 380/10 |
| 4,684,981 | 8/1987 | Toyoshima et al. | 358/86 |
| 4,691,351 | 9/1987 | Hayashi et al. | 380/10 |
| 4,706,121 | 11/1987 | Young | 358/142 |
| 4,710,921 | 12/1987 | Ishidoh et al. | 370/110.1 |
| 4,712,239 | 12/1987 | Frezza et al. | 380/20 |
| 4,739,510 | 4/1988 | Jeffers et al. | 380/15 |
| 4,750,036 | 6/1988 | Martinez | 358/147 |
| 4,750,167 | 6/1988 | Meyer | 370/77 |
| 4,751,578 | 6/1988 | Reiter et al. | 358/183 |
| 4,764,981 | 8/1988 | Miyahara et al. | 455/603 |
| 4,788,675 | 11/1988 | Jones et al. | 370/69.1 |
| 4,792,849 | 12/1988 | McCalley et al. | 358/86 |
| 4,821,097 | 4/1989 | Robbins | 358/143 |
| 4,821,260 | 4/1989 | Klank et al. | 370/77 |
| 4,825,200 | 4/1989 | Evans et al. | 341/23 |
| 4,825,209 | 4/1989 | Sasaki et al. | 340/825.72 |
| 4,829,372 | 5/1989 | McCalley et al. | 358/86 |
| 4,871,992 | 10/1989 | Petersen | 340/407 |
| 4,887,152 | 12/1989 | Matsuzaki | 358/86 |
| 4,894,714 | 1/1990 | Christis | 358/86 |
| 4,905,094 | 2/1990 | Pocock et al. | 358/342 |
| 4,908,707 | 3/1990 | Kinghorn | 358/172 |
| 4,914,517 | 4/1990 | Duffield | 358/191.1 |
| 4,920,566 | 4/1990 | Robbins et al. | 380/19 |
| 4,922,483 | 5/1990 | Kobayashi | 370/73 |
| 4,922,537 | 5/1990 | Fredericksen | 381/31 |
| 4,937,807 | 6/1990 | Weitz et al. | 369/85 |
| 4,937,821 | 6/1990 | Boulton | 370/69.1 |
| 4,953,208 | 8/1990 | Ideno | 380/15 |
| 4,959,720 | 9/1990 | Duffield et al. | 358/191.1 |
| 5,014,125 | 5/1991 | Pocock et al. | 358/86 |
| 5,027,400 | 6/1991 | Baji et al. | 380/20 |
| 5,036,537 | 7/1991 | Jeffers et al. | 380/20 |
| 5,038,211 | 8/1991 | Hallenbeck | 358/142 |
| 5,038,402 | 8/1991 | Robbins | 455/3 |
| 5,063,610 | 11/1991 | Alwadish | 455/45 |
| 5,086,298 | 2/1992 | Katsu et al. | 340/825.69 |
| 5,091,936 | 2/1992 | Kotznelson et al. | 380/19 |
| 5,119,503 | 6/1992 | Mankovitz | 455/45 |
| 5,119,507 | 6/1992 | Mankovitz | 455/154.1 |
| 5,134,719 | 7/1992 | Mankovitz | 455/154.1 |
| 5,173,900 | 12/1992 | Miller et al. | 370/110.1 |
| 5,191,410 | 3/1993 | McCalley et al. | 358/86 |
| 5,195,092 | 3/1993 | Wilson et al. | 370/94.2 |
| 5,214,792 | 5/1993 | Alwadish | 455/45 |
| 5,239,540 | 8/1993 | Rovira et al. | 370/77 |
| 5,287,351 | 2/1994 | Wall, Jr. | 370/77 |
| 5,293,633 | 3/1994 | Robbins | 455/3.1 |
| 5,319,707 | 6/1994 | Wasilewski et al. | 380/14 |
| 5,406,558 | 4/1995 | Rovira et al. | 370/77 |

OTHER PUBLICATIONS

S.M. Edwardson and A. Gee., "CEEFAX: A Proposed New Broadcasting Service", Journal of the SMPTE, Jan. 1974, pp. 14–19.

A. James, "Oracle–Broadcasting the Written Word", Wireless World, Jul. 1973.

R.T. Russell, "Teletext Remote Control–2", Wireless World, May 1979, p. 83.

National Technical Report, vol. 25, No. 4 (Aug. 1979).

Article from Broadcasting, "The Return Of Digital Radio On Cable", Jun. 25, 1990.

J.S. Lublin, Article from the Wall Street Journal, "Cable TV to See If Cable Radio Means Sweet Music for Revenue", Nov. 6, 1990.

Dietrich Schwarze, "Digital Sound Broadcasting and its Significance for the Listener", pp. 521–530 and the English translation, pp. 1–10, 28 Nov. 1989.

P. Treytl, "Digital Sound Service For Direct Broadcasting Satellites", pp. III–114, undated.

FIG. 8

| FIELD | SIZE | DEFINITIONS |
|---|---|---|
| <S> | 1 | Start of TITLE Field |
| <TITLE> | 24 | TITLE Information |
| <DL> | 1 | Start of TRACK Field |
| <TRACK> | 24 | TRACK Information |
| <DC1> | 1 | Start of ARTIST Field |
| <ARTIST> | 24 | ARTIST Information |
| <DC2> | 1 | Start of LP LABEL Field |
| <LP LABEL> | 24 | LP LABEL Information |
| <DC3> | 1 | Start of COMPOSER Field |
| <COMPOSER> | 24 | COMPOSER Information |
| <DC4> | 1 | Start of SONG ID Field |
| <SONG ID> | 10 | SONG ID Information |
| <COPY PROTECT> | 1 | Copy protect ("Y"= On, "N"= Off) |
| <PLAYTIME> | 4 | (0000-9999) # of Seconds the Current Selection Will Play |

METHOD AND APPARATUS FOR COMMUNICATING DIFFERENT TYPES OF DATA IN A DATA STREAM

This application is a continuation on Ser. No. 08/171,453 filed Dec. 22, 1993, now abandoned which is a continuation of Ser. No. 08/056,560 filed May 3, 1993, now U.S. Pat. No. 5,406,558 which is a division of Ser. No. 07/618,744 filed Nov. 27, 1990, now U.S. Pat. No. 5,239,540.

TECHNICAL FIELD

The present invention relates to the field of digital signal transmission and more particularly, to transmitting digital signals accompanied by pro,ram content data so that listeners/viewers may see a display of the program content data as they are listening/viewing the performance, without interrupting the performance.

BACKGROUND OF THE INVENTION

Presently, program content information, for example, song title, artist, record label, etc., is communicated to the customer/listener by announcers' disc jockeys (DJs). In the ease of video program transmitted by broadcast means, video text are presented between programs and during interruptions of program. In the ease of many premium services, it is undesirable to interrupt programs for presentation of program content information. It may also be undesirable to have any form of announcer or DJ between program or selection of music.

Those such announcers or interruptions of program may be undesirable in some services. Nevertheless, it is highly desirable to communicate program content information. Frustration of customers, and possible loss of revenue due to subscription cancellation can occur if a subscriber has no method of knowing the title composer or artist of the particular selection of music. To the music industry, identification of recording label and identification number is critical to sale of the recordings. Currently, a subscriber viewing a premium video program must consult a separate listing, tune to a different channel, or wait till the end of the program for its identification.

Similarly, the cable television industry is currently introducing audio-only services. Program content information is printed in a separate listing. These cable "radio stations" may play a continuous succession of musical selections without commercial interruptions. These services may not use a "disc-jockey" to identify the musical or other selections. Instead, under the present invention, data channels will contain information about the music being played.

In one embodiment of the present invention, a display of this data has been envisioned that has been termed an "electronic DJ". This display could be built into the subscriber terminal itself, or it could be a separate display unit that would connect to a port on the rear panel of the terminal.

The problem with such displays is that, unless they are very large and therefore costly, they cannot be easily placed within reading distance of the listener. Long cables for the display would be difficult to route in a typical living room, and we need only look at the success of VCR wired remote controls to convince ourselves that such a tethered display would not be optimum.

Wireless remote controls have brought great convenience to the control of consumer products. Highly intelligent remote controls with liquid crystal displays are available. Programmable and universal "learning" remote controls are available that assume the functions of multiple other controls. These remote controls receive information from each other, and display the functions available to the user.

It can be a frustrating experience to enjoy a piece of music on the radio, only to have the station fail to identify the piece. To lovers of music, having such information as music title, composer, artist and record label is vital. Without this information, the service will be reduced to the level of generic background music.

SUMMARY OF THE INVENTION

The problems and related problems of transmitting and providing a display of program content data are solved by the principles of the present invention. In furtherance of these principles, it is an object of the present invention to provide program information to subscribers without interrupting the program.

It is an object of the present invention to transmit and provide program information for digital audio transmitted to subscribers, where the program information is combined with the digital audio.

It is a further object of the present invention to provide program data to subscribers of video information.

It is another object of the present invention to provide program to subscribers where the information is communicated through a remote control unit.

It is a further object of the present invention to provide a system where digital program information is combined with digital audio/video signals which are transmitted via satellite, coaxial cable, or other means to subscribers.

It is another object of the present invention to provide program data corresponding to audio/video signals to subscribers with disabilities.

In accordance with these and other objects, apparatus for encoding according to the present invention comprises: a plurality of means for producing digital signals; a plurality ol means for producing a plurality of program data signals, each program data signal corresponding to one digital signal; and, at least one encoding means, coupled to the plurality of means for producing digital and program data signals, for encoding the plurality of program data signals with the plurality of digital signals to produce a plurality of combined digital and program data signals.

Additionally, under these and other objects, a method is disclosed for encoding program information into a digital data stream comprising the steps of: producing a plurality of digital signals; producing a plurality of program data signals, each program data signal corresponding to one digital signal; and encoding the plurality of program data signals with the plurality of digital signals to produce a plurality of combined digital and program data signals.

Conversely, under the above and other objects, an apparatus is disclosed for communicating program information corresponding to a track of digital data from a signal containing a plurality of digital and program information signals comprising: first receiving means for receiving an encoded signal containing a plurality of digital signals and a plurality of program data signal, each program data signal corresponding to one digital signal; at least one selecting means, coupled to the first receiving means, for selecting one digital signal and one correspoonding program data signal from the received encoded signal; at least one decoding means, coupled to the selecting means, for decoding the selected one digital signal and the one corresponding program data signal so as to separate the corresponding program data signal from the selected one digital signal; transmitting means, coupled to the decoding means, for transmitting the one corresponding program data signal; second receiving means, coupled to the transmitting means, for receiving the one corresponding program data signal; and, communicating means, coupled to the second receiving means, for communicating the one corresponding program data signal.

Similarly, a method under the above objects is disclosed for communicating program information corresponding to a track from signal containing a plurality of digital and program information signals comprising the steps of: receiving an encoded signal containing a plurality of digital signals and a plurality of program data signals, each program data signal corresponding to one digital signal; selecting one digital signal and one corresponding program data signal from the received encoded signal; decoding the selected one digital signal and the one corresponding program data signal so as to separate the coresponding program data signal from the selected one digital signal; transmitting the one corresponding program data signal to a communicator; receiving the transmitted one corresponding program data signal; and, communicating the received one corresponding program data signal via the communicator.

Finally, under the objects of the present invention, a handheld apparatus for communicating program information corresponding to digital data is disclosed comprising: receiving means for receiving a program data signal corresponding to a digital track; processing means, coupled to the receiving means, for processing the received program data signal; and, communicating means, coupled to the processing means, for communicating the processed program data signal.

The communicating means under the present invention could take the form of a standard remote control, i.e. a hand-held unit with a display of some sort. The display could be a liquid crystal or other suitable technology. A benefit of having the display in a remote unit under the present invention is that the cost of the display need not be included in the base unit. The display can be a value-added extra-cost feature. It can thus be seen as a means of increasing revenue, or of making the service more affordable to those not desiring the feature.

The communicating means under the present invention could also take the form of a table-mounted unit. It could use a larger display than might be possible on a hand-held remote. It could also use ac power instead of batteries and thus power a brighter and larger display more suitable for low light viewing. The control and display functions could be separated into two individual units.

The base subscriber terminal could automatically update the remote display/control unit whenever there has been a change in programming. This, however, may result in brief intervals during which the use of other remote controls might be disrupted. Instead, the communications may be structured such that for information to be sent from the base subscriber terminal, it must be polled from the remote unit. Memory could be used in either the base unit or the remote to store information on previous selections. This information could be recalled by the user on demand.

The communications link between the base subscriber terminal and the remote unit could use radio frequencies, infrared, visible light, acoustical transmission through air, or other wireless means. The concept could also be extended to carrying the information on the household power lines, telephone wires, coaxial cable fiber-optic cable or means other than the direct connection of a cable to the base unit.

BRIEF DESCRIPTION OF THE DRAWINGS

These and other advantages of the present invention may be appreciated from studying the following detailed description together with the drawings in which.

DETAILED DESCRIPTION

Figure 1:
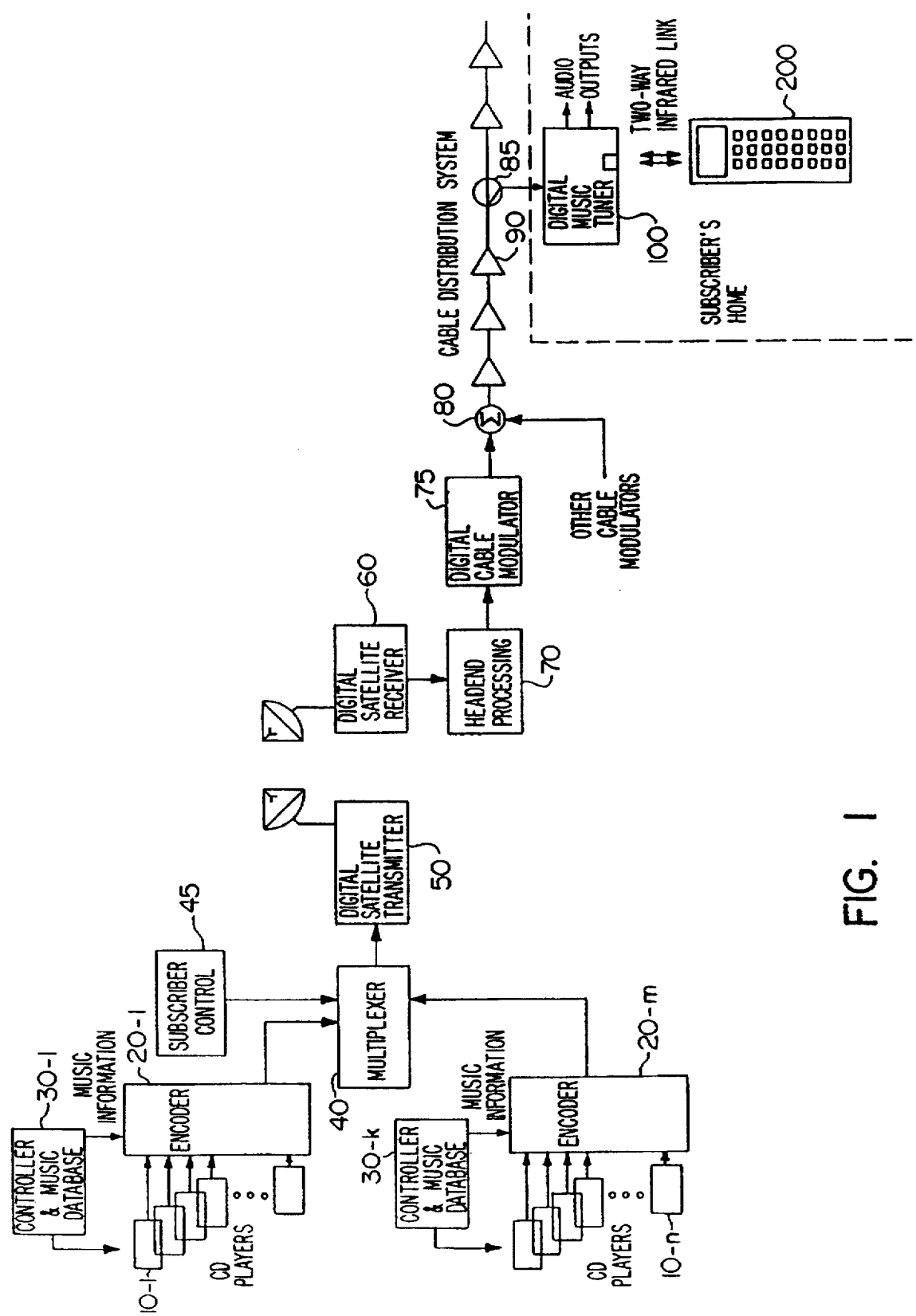
FIG. 1 is a blocked diagram of the overall system in the present invention.

Referring to FIG. 1, a block diagram of an overall system in the present invention is described. The present invention will be described with respect to transmitting audio signals with program data. However, those skilled in the art will recognize that the present invention may, instead of transmitting audio with corresponding program data, transmit any of the following, with corresponding program data: television, games, software, video, and other combinations of audio/video or software information.

Compact disc players 10-1 through 10-n provide a plurality of digital audio signals to the present invention. These CD players may be the so called "Jukebox" type wherein up to sixty or more compact discs may be stored and accessible by the player.

The digital audio signals from CD players 10-1 through 10-n are input to encoders 20-1 through 20-n which will be described in greater detail with reference to FIG. 3. Controller and music database 30-1 through 30-k controls the output of CD players 10-1 through 10-n and any respective selection of compact discs within these players and also provides a database containing program data with a one to one correspondence to the tracks contained on the compact discs. This program data includes title, track, artist, publisher, composer, song identification and play time information blocks for each song contained on a compact disc. These program data signals could also include other information relevant to describing the particular track contained on a compact disc, as those skilled In the art can appreciate. For example, if the information were historical audio data, information on the time and place such data was first conceived or transmitted may also be contained within this program information. Additionally, if the digital signals transmitted contained video information, the corresponding program data signals would relate to the video program being transmitted, for example, the title, actors, director, publisher, year, or other relevant information.

The plurality of digital audio signals inputted by the CD players 10-1 through 10-n are combined in encoders 20-1 through 20-n with the program data signals inputted by controller and music databases 30-1 through 30-k. The combined signals from encoders 20-1 through 20-n are then input ted into multiplexer 40 which combines the signals into a serial digital data stream.

Additional signals may be combined with the digital audio and program information signals. Subscriber control 45 contains information on various subscribers who may receive the digital audio data produced by the present invention. This subscriber information stored in subscriber control 45 is multiplexed with the digital audio and program data signals in multiplexer 40, producing a serial digital data stream containing digital audio program information and national subscriber information.

The serial digital audio/program data stream from multiplexer 40 is input into the digital satellite transmitter 50 and broadcast, via satellite, to digital satellite receiver 60. However, those skilled in the art will realize that any delivery system, not just satellite transmission, may be used, such as cable television (CATV), microwave distribution (MDS or MMDS), telephone systems, terrestrial broadcasts, and other coaxial or optical cable lines.

The previously described transmitter section will be more fully discussed with reference to FIG. 2, while the following receiver section will be more fully described with reference to FIG. 4. Digital 70 which in turns converts and sends the information to digital cable modulators 75. The digital audio data is then added with signals from other cable modulators in summing circuit 80 and sent over a cable distribution system.

The cable distribution system includes line amplifiers 90 for boosting the signal and compensating for any line loss. System tap directs the combined signal to a subscriber's premises and into digital music tuner 100. Digital music tuner 100, more fully described with respect to FIG. 5, selects the channel containing the digital audio and program data signals. Additionally, digital music tuner 100 separates the digital audio signal from the program information signal. The digital audio signal is converted to analog, amplified and output on a subscriber's audio electronics, while the program information signal is processed and sent to a local display or remote using information display 200. The demultiplexing and decoding of the signals is discussed more fully with reference to FIG. 6. These displays then communicate to the subscriber the particular program information corresponding to an audio track currently being listened to by the subscriber. The remote music information display is more fully described with respect to FIG. 7.

Transmitting Section

Figure 2:
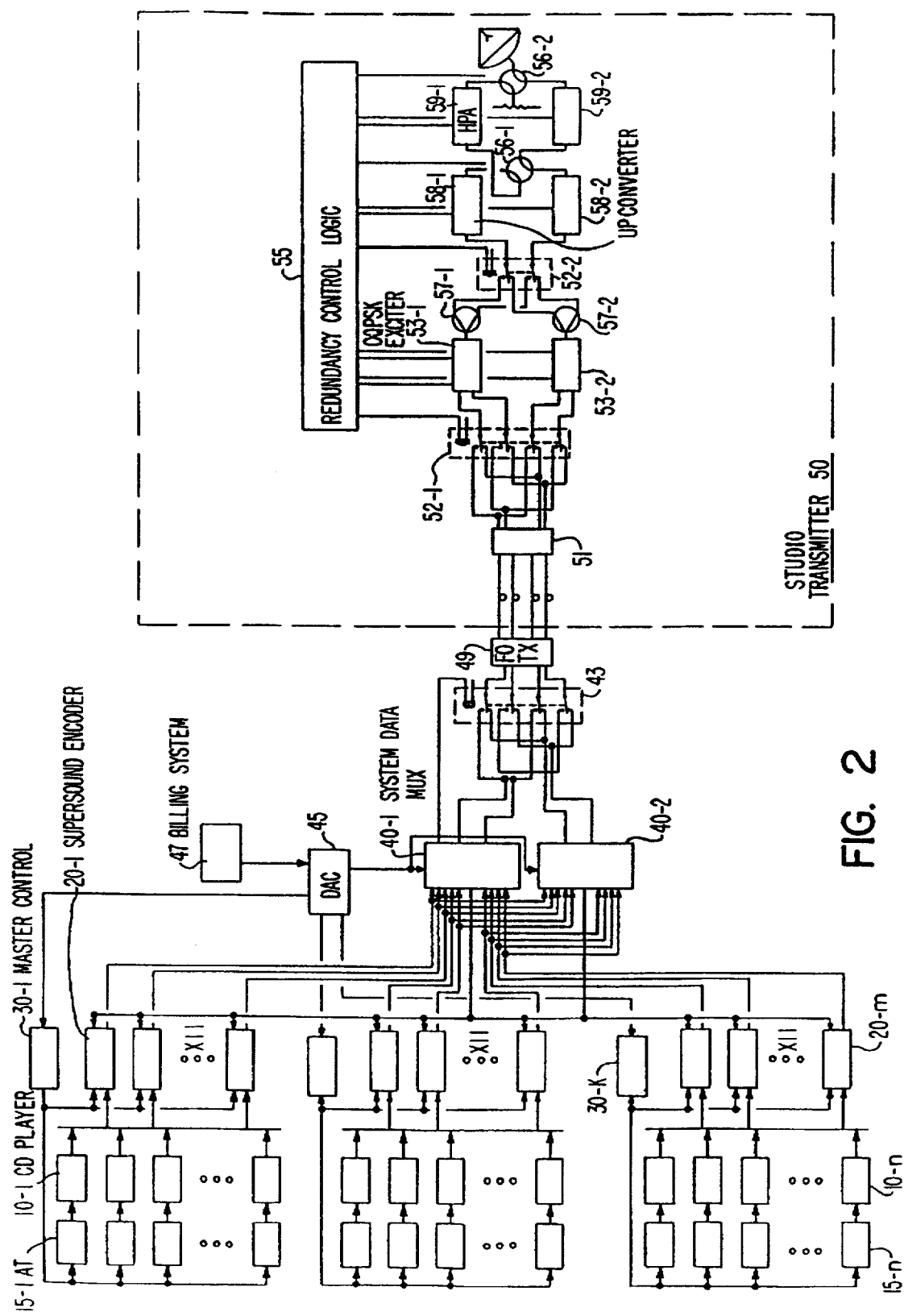
FIG. 2 shows a detailed block diagram of the encoding and transmitter portion of the present invention.

Referring to FIG. 2, a block diagram of the studio and transmitter, or uplink, section of the present invention is described. Compact disc players 10-1 through 10-n are driven by microcomputers 15-1 through 15-n. Microcomputers 15-L through L5-n could be IBM Model AT microcomputers. These microcomputers are in turn controlled by the studio sequencing master controllers 30-L through 30-k. These master controllers 30-L through 30-k include a database containing the program information described above. These master controllers are preferably IBM Model PS/2 microcomputers or other computers containing a 386 type microprocessors.

The digital audio output from CD players 10-1 through 10-n is input into encoders 20-1 through 20-n along with program information supplied by master controllers 30-1 through 30-k. Encoders 20-1 through 20-n combined the digital audio signals with the program data signals and output the combined signal to system data multiplexers 40-1 and 40-2. Preferably, the outputs or 30 encoders 20-1 through 20-30 are input into multiplexers 40-1 and 40-2 where the signals are time division multiplexed. Multiplexers 40-1 and 40-2 may include error correction encoding using, for example, Hamming encoding or Bose Chaudhuri Hocquenghen (BCH) encoding, or other error correcting/encoding methods known by those skilled in the art.

Billing system 47 includes subscriber information of the present invention and national control information and may be comprised of an IBM Model PS/2 microcomputer. The subscriber information and other billing system data would be contained within a large database within billing system 47. Typical billing system data could include, for example, identity, location, etc. for subscribers and their current billing status. Billing system information from billing system 47 is input into the system manager digital audio controller 45. System manager 45 is preferably comprised of a series 8500 System Manager manufactured by Scientific Atlanta or a similar product. System manager digital audio controller 45 controls master controllers 30-1 through 30-k. Additionally, the system manager 45 may also input subscriber data from the subscriber database within billing system 47 into multiplexers 40-1 and 40-2.

The subscriber information may be combined with the digital audio and program signals through multiplexers 40-1 and 40-2. Multiplexers 40-1 and 40-2 provide the master clock to all the encoders 20-1 through 20-n and to satellite exciters 53-1 and 53-2. The output of multiplexers 40-1 and 40-2 is a 34 megabits per second (Mbps) data stream comprising the preferred 30 channels outputted by the 30 encoders 20-1 through 20-30.

Relay circuit 43 provides fault protection so as to switch the system to multiplexers 40-2 and 40-2 from multiplexer 40-1 in event of a fault. The outputs from multiplexers 40-1 and 40-2 are two coaxial cables, for plus and minus balanced connections. These balanced coaxial cables are used from the output of multiplexers 404 and 40-2 through satellite transmitting and receiving electronics. The combined signal from multiplexer 40-1 passes through relay 43 into fiber-optic transmitter 49. Fiber-optic transmitter 49 transports the signal from the studio to the transmitter site and into fiber-optic receiver 51. The output of the fiber-optic receiver drives an offset quadrature phase shift keying (OQPSK) satellite modulator 50. The signal is then up converted, amplified and transmitted to the satellite, as more fully described below.

The signals are received from fiber-optic transmitter 49 into fiber-optic receiver 51 in transmitter 50. From fiber-optic receiver 51 the signals pass through fault protection relay 52-1 into Exciter 53-1. The digital signals from OQPSK exciter 53-1 enter splitter 57-1 and through fault protection relay 52-2. Thereafter, the signals pass through an upconverter 58-1. From upconverter 58-1 the signals pass through switch 56-1 into high powered amplifier 59-1 and once again through switch circuit 56-2 and then transmitted. The transmitting Is preferably performed via a satelifted. The transmission may also occur via coaxial cables or fiber-optic cables.

Redundancy control logic 55 controls transmitter 50, so in the event of a fault, redundant circuitry is activated. Specifically, redundancy control logic 55 controls relays 52-1 and 52-2 and switches 56-1 and 56-2 so as to switch to redundant exciter 53-2 and splitter 57-2, redundant up converter 58-2 and high powered amplifier 59-2.

Figure 3:
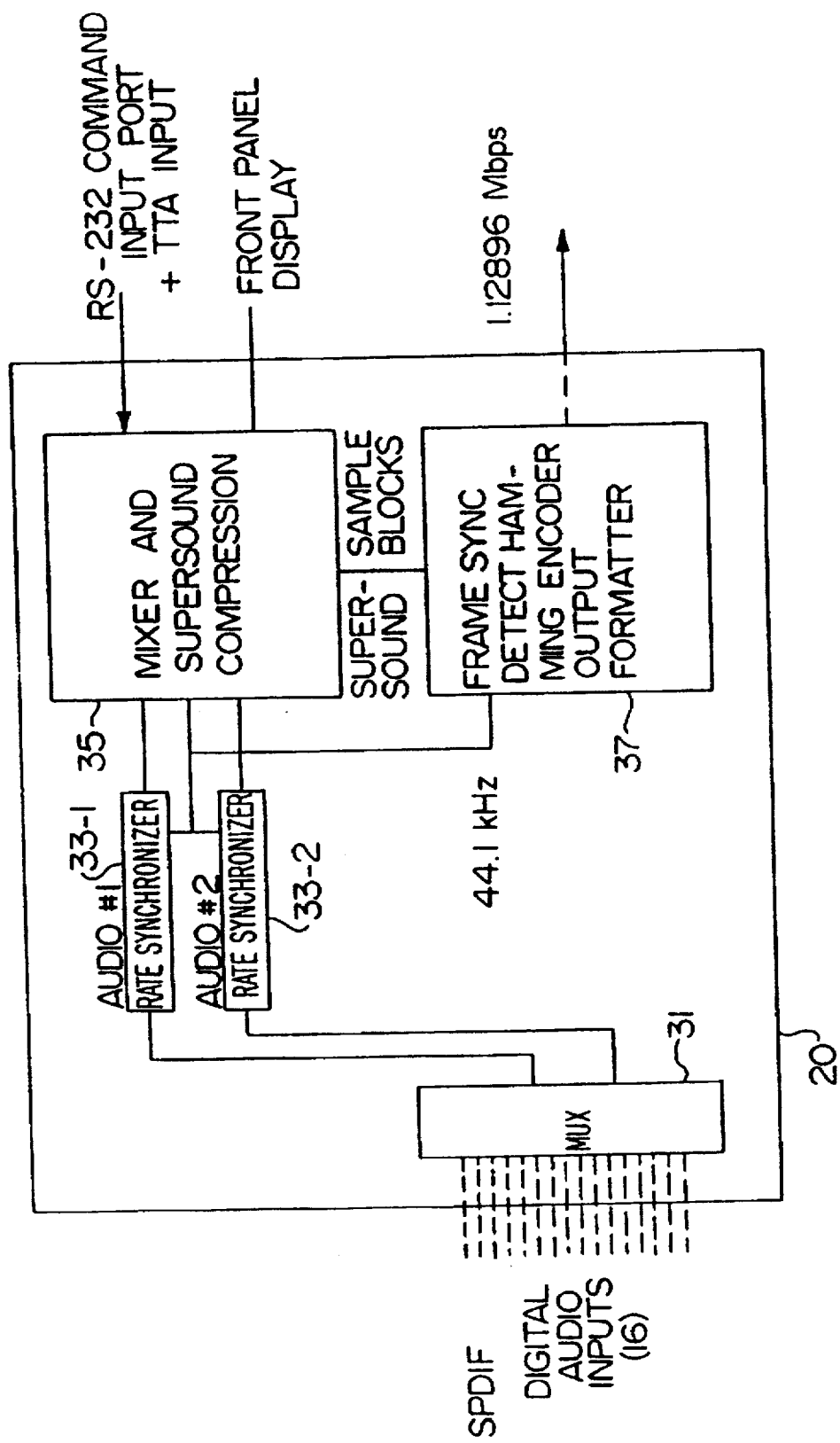
FIG. 3 shows a block diagram of the encoding portion of the present invention.

Referring to FIG. 3, a more detailed block diagram of an encoder 20-1 is described. Outputs from CD players 10 are input to multiplexer 31. Preferably the outputs from 16 CD players 10-1 through 10-16 are input into multiplexer 31 where their signals are combined and output as two channels to rate synchronizers 33-1 and 33-2. The rate synchronized signals are then input into mixer and signal compressor 35. Mixer and signal compressor 35 preferably uses the data compression format described in U.S. Pat. No. 4,922,537, incorporated herein by reference. Mixer and data compressor 35 is controlled by input signals from master controller 30-1 which also inputs the program data signals corresponding to the digital audio signals. The digital audio signals are compressed, program data signals are, mixed therewith, and then the mixed signal is input also include circuitry to encrypt the mixed and compressed signals using, for example, the Data Encryption Standard (DES) or using other similar encryption techniques known in the art. Circuit 37 may include error correction encoding using, for example, Hamming encoding or Bose Chaudhuri Hocquenghen (BCH) encoding, or other error correcting/encoding methods known by those skilled in the art. Hamming encoding is disclosed in *Electronic Engineers Reference Book*, edited by F. Mazda, page 32/10, incorporated herein by reference.

The audio data is clocked into and out of circuits 33-t, 33-2, 35 and 37 at a rate of 44.1 kilosamples per second. The mixed compressed and encrypted signals are output of circuit 37 at 1.12896 Mbps in Applicant's preferred embodiment.

Receiving Section

Figure 4:
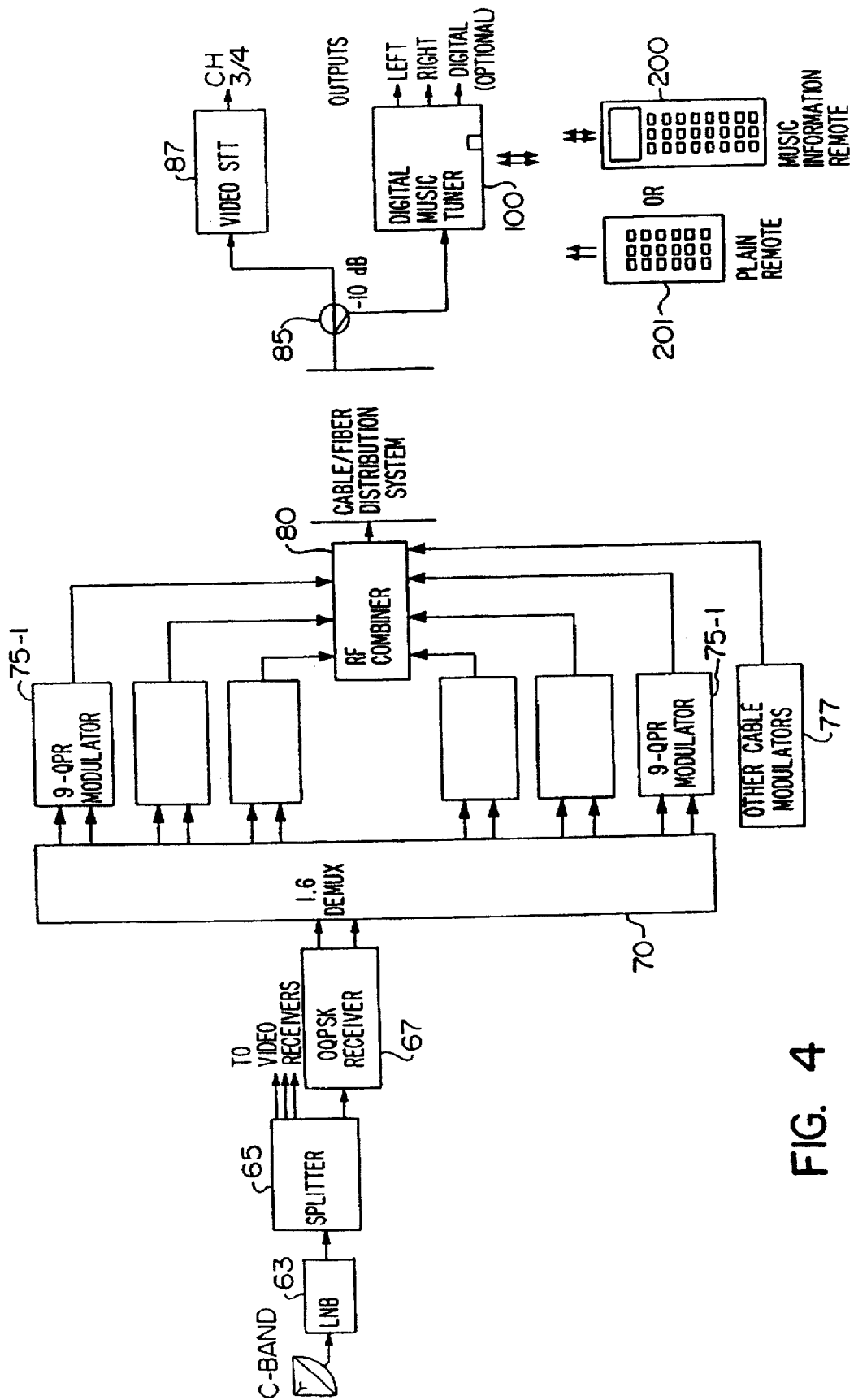
FIG. 4 shows a block diagram of the receiving portion of the present invention.

Referring to FIG. 4, the mixed, compressed and encrypted signal is received in the C-band via Satellite receive antenna and amplified and block converted in a low-noise block converter 63, along with other satellite distributed signals. The signal is output in the L-band at 950 to 1450 megahertz and input into splitter 65 where the audio signal is input into OQPSK receiver 67. Receiver 67 demodulates the OQPSK information and provides one 34 Mbps signal stream containing the preferred 30 satellite distributed channels. The 34 Mbps signal is output of receiver 37 at 34 megahertz clock rate into demultiplexer 70. Preferably, demultiplexer 70 is a 1:6 demultiplexer which separates the single data stream into six channels containing 5.6 Mbps digital audio and program data each. These six channels contain five stations each.

The signals are clocked at 11 megahertz to modulators 75-1 through 75-6. Each modulator 75-1 through 75-6 is a nine state quadrature partial response (9-QPR) modulator capable of handling five stations and each occupying a 3 megahertz bandwidth. Those skilled in the art will appreciate that one may also use phase shift key modulation or other modulation methods known in the art with fewer or greater numbers of states.

The modulated signals from modulators 75-1 through 75-6 are combined in radio frequency combiner 80 along with other modulated signals from other cable modulators 77. Modulators 75-1 through 75-6 digitally filter the data, quadrature partial response (QPR) modulate and convert the data to the selected output frequency for combining with other modulated channels 77 in the present cable television system. Each block of five stereo pairs occupies 3 megahertz of band width and can be carried in half of one 6 megahertz video channel of the present cable television system. Since the present system uses a common 6 megahertz video channel, no modifications of current CATV distribution system equipment is required.

The combined signals from RF combiner 80 are distributed over a coaxial cable or fiber-optic distribution system into a subscriber's home. Directional coupler 85 directs most of the signal to video set top terminal 81. A sample of the signal is sent from directional coupler 85, at a loss of 10 decibels to digital music tuner 100. Tuner 100 is controlled by either a plain remote 201 or a music information display remote 200. Additionally, tuner 100 outputs left and right analog audio signals, and may also output an optional digital signal output.

Figure 5:
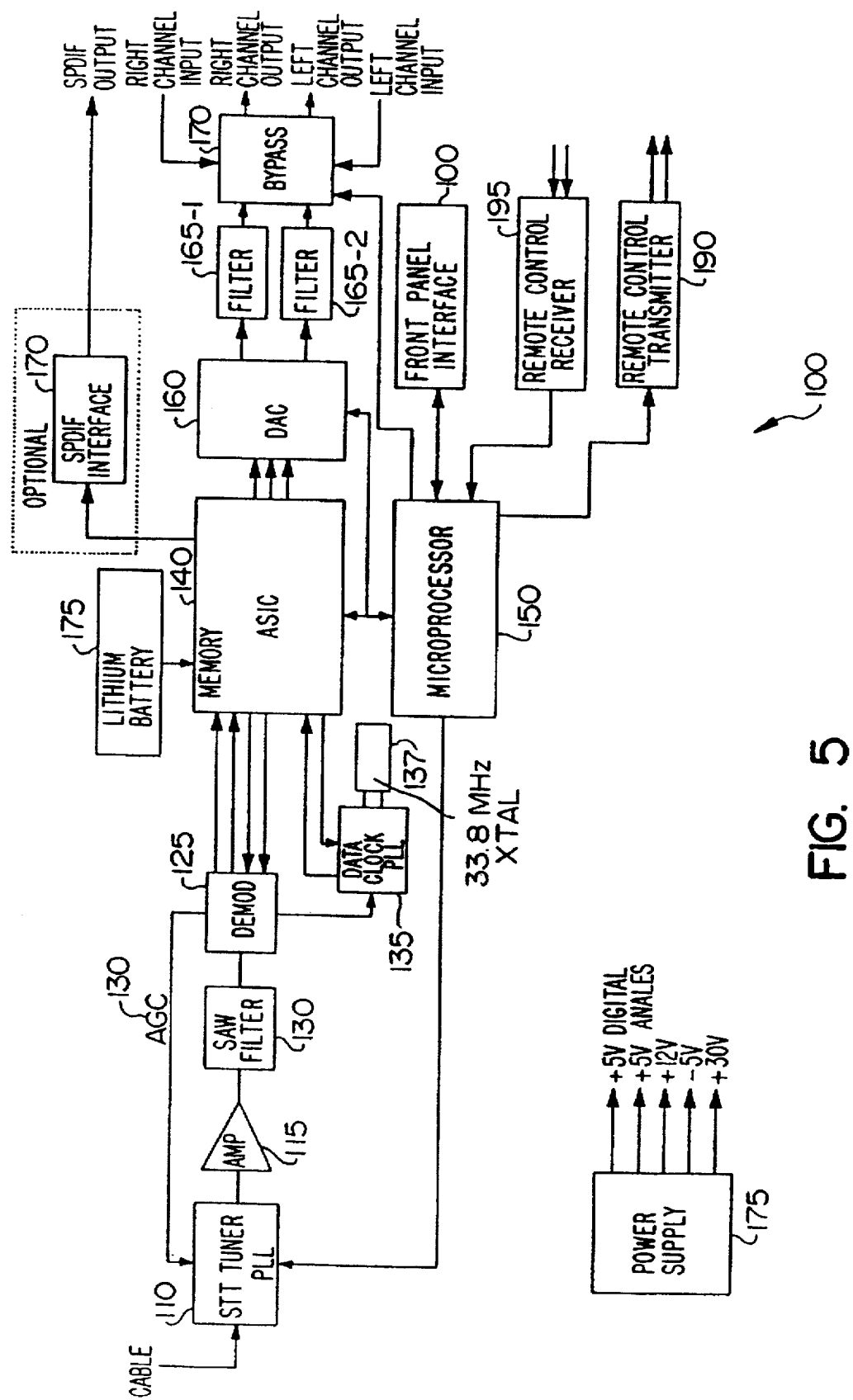
FIG. 5 shows a block diagram of the digital music tuner.

Referring to FIG. 5, a block diagram of digital music tuner 100 is shown. The digital audio and program data signal is inputted from directional coupler 85 into set top terminal tuner 110. This tuner preferably includes phase locked loop circuitry. The signal from tuner 110 is amplified by amplifier 115 and filtered by saw filter 120 before being demodulated by demodulator 125. Tuner 110 converts the selected radio frequency channel to a demodulation intermediate frequency. The output of demodulator 125 is QPR demodulated to produce a 5.6 Mbps data stream containing five stereo pair of digital audio data to applications specific integrated circuit (ASIC) 140. Demodulator 125 also provides an automatic gain control signal 130 to tuner 110 to maintain constant signal level. Additionally, demodulatot 125 provides data to clock recovery phase locked loop (PLL) 135. Data clock PLL 135 contains a 33.8 megahertz crystal 137 from timing purposes.

This timing signal is sent to ASIC 140, which will be discussed in greater detail with reference to FIG. 6. ASIC 140 provides a digital audio output to interface 170. Interface 170 uses the Sony-Philips digital interface format (SPDIF). Similarly, the digital audio signals are input from ASIC 140 to digital to audio converter 160. From digital to audio converter 160, the analog left and right audio signals are filtered through filters 165-1 and 165-2 and input into bypass 170. Bypass 170 allows additional audio components (e.g., a CD player or tape deck) to be switchably connected with the digital music tuner 100.

Microprocessor 150 controls phase locked loop of tuner 110, ASIC 140, digital to analog converter 160 and bypass 170. The program data signal from ASIC 140 is sent to microprocessor 150 where it is stored in internal memory of the microprocessor, and may be displayed on front panel interface 180 or transmitted through remote control transmitter 190. Remote control receiver 195 may select particular program data information or audio channels through microprocessor 150.

Power supply 175 would supply both positive five volt digital and analog power, and a negative five volt supply to the system. Positive 12 volt and positive 30 volt power supply signals are also provided from power supply 175. Additionally, tuner 100 would preferably have input means, e.g., push buttons or toggle switches, on the exterior of its housing (not shown). These input means would allow selection of channels, stations, display of program data and display of particular information blocks contained in The program data signal. Additional selections or inputs may be provided as those skilled in the art recognize.

Figure 6:
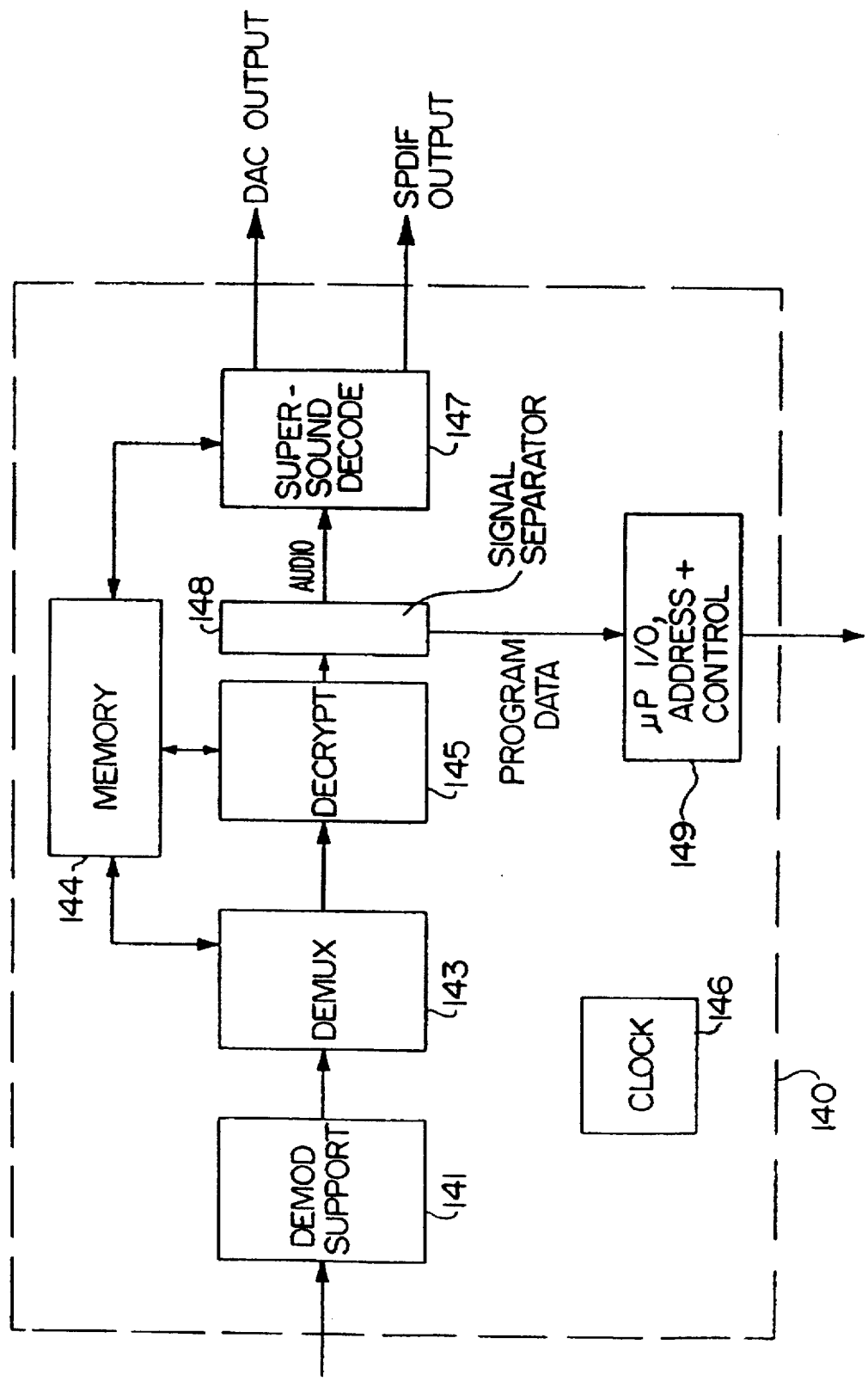
FIG. 6 shows a block diagram of the application specific integrated circuit shown in FIG. 5.

Referring to FIG. 6, a more detailed block diagram of ASIC 140 is provided. The signal from demodulator 125 is input into demodulator support circuit 141 which comprises logic circuitry (e.g., flip-flops) required in demodulation of the signal. The signal from demodulator support circuit 141 is then input into demultiplexer 143 which separates the 5.6 Mbps data stream to select one of five stereo pairs of digital audio signals. This signal is then sent to decrypting circuit 145. The decrypted signal is then separated in signal separator 148 where program data is sent to microprocessor in/out circuit 149 while audio data is sent and decoded in circuit 147. Decoder 147 uses the data decompression technique described in U.S. Pat. No. 4,922,537, incorporated herein by reference.

Microprocessor in/out, address and control circuit 149 interfaces with microprocessor 150. All circuit within ASIC 140 are driver, by clock 146. Memory 144 stores bits of data to support the demultiplexing, decrypting and decoding functions occurring in circuits 143, 145 and 147 respectively. The memory may be of a nonvolatile type such as an EPROM or similar ROM memory or may be a volatile type RAM memory supported by battery 175, preferably a lithium type battery. Such a battery 175 would prevent loss of data stored in memory 144.

Remote Display Unit

Figure 7:
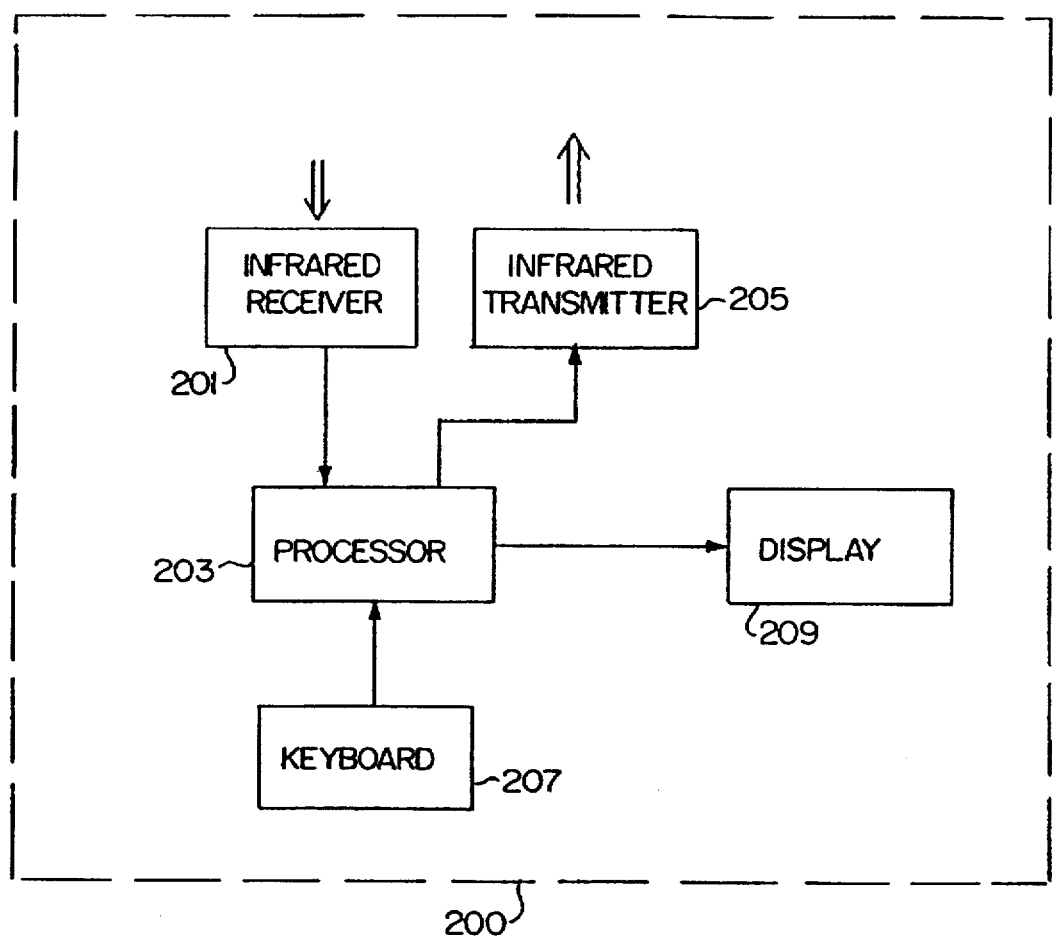
FIG. 7 shows a block diagram for the remote communication device of the present invention; and, FIG. 8 shows a diagram of a simplified frame format using the present invention.

Referring to FIG. 7, a block diagram of the remote music information display unit 200 is shown. Program data signals are received by receiver 201 from remote control transmitter 190. Preferably, infrared transmitter and receivers 190, 195, 201 and 205 are used. However, radio frequency, ultrasonic, wire, fiber-optic cables or other means could two used as those skilled in the art can appreciate. The received signal is then input into processor 203 which processes and sends the program data signal to display 209 for communicating program data corresponding to currently playing audio track to a subscriber. Display 209 may be a liquid crystal display, a light emitting diode, a braille reader, a voice synthesizer or a cathode-ray tube or any other communicating device as may be appreciated by those skilled in the art. Audible or tactile communicating means would allow communication of the program data signals to subscribers with disabilities, as would the use of a remote unit.

Input means shown as keyboard 207 may receive program data selection commands or audio track commands from a subscriber which are sent to processor 203. Keyboard 207 may also include means to allow a subscriber to control volume, power, channel selection, station selection, display, or other suitable subscriber commands that those skilled in the art appreciate. Processor 203 then converts and transmits the subscriber command signal to transmitter 205 which is received by remote control receiver 195. The received signal from receiver 195 is input into microprocessor 150 where appropriate signals are sent therefrom to ASIC 140 and tuner 110 so as to bring about the subscriber's desired audio track, audio channel or program information.

Repeaters could be placed throughout a dwelling to extend the range of the display/control unit. Additionally, processor 203 could contain memory for storing various information, particularly program information.

In an alternative embodiment, the remote display unit may display only a code number representing the program data signals, whereby a subscriber may reference the number in printed material for a full description of the currently playing audio track. The printed material could be a publication which would rotate monthly or weekly as the programs on respective stations change. Such a system would allow for a smaller display on the remote unit, and thus be less costly to a subscriber. Such a printed publication would also allow a subscriber to determine which programs were playing on the various channels.

Additionally, the remote display unit or tuner 100 could display, upon a subscriber's request, program data corresponding to data being transmitted on channels not currently being listened to/viewed by the subscriber. In this way, a subscriber may scan what is being broadcast on alternate channels while listening to a currently playing channel.

Data Format

The preferred thirty stereo audio stations are multiplexed as follows. Groups of five stations are formatted into a frame of data. Six such frames are interleaved bit by bit for transmission over the satellite. Each such frame containing five stations has a header. This header is used by the headend demultiplexer 70 to deinterleave the satellite received data into six frame of five stations each. The header is also used in the ASIC 140 to synchronize on the frame. A second header contains subscriber control transaction data. This second header would preferably include channel and subscriber transaction data as previously described with respective billing system 47 The headers include additional bits for error detection.

Following the headers, compressed audio data with its associated program data is sent. Audio data for each station includes a seven bit "k factor" and a three bit "exponent" for each block of nine samples as described in previously referenced U.S. Pat. No. 4,922,537. Five such k factor and exponent blocks for each station are included in each frame.

The audio and program data for the five stations in the frame are interleaved bit by bit. That is, the first bit is sent for station No. 1, followed by the first bit for station No. 2 and so on until the first bit of each station has been sent. Then the second bit of each station is sent and so on. After the last audio data bits in each block of nine samples have been sent, the program data bits are sent in the same manner. Thus, the program data for each station is multiplexed in the frame with its associated station so that when the frame is demultiplexed or rearranged, the program information for that station is kept with its station. The advantage of multiplexing the program information with the audio data is that one may easily process the combined signal without fear of scrambling channels of audio data with their respective program information. Error correction and detection bits are also sent with the audio data and the program data.

Two program data bits are sent in the same block together with every nine compressed samples (100 bits) of audio data. This effectively provides a data channel of about 9800 baud used to transmit program data information. The information is sent in ASCII representation, but could easily be sent in other formats such as EBCDIC as would be apparent to those skilled in the art. FIG. 8 shows the program information as preferably sent and the size of each field in the present embodiment. Other information can be sent, such as music classification for selection of station by music type, special event announcements, or other such information, known by those skilled in the art.

We claim:

1. A method for transmitting different types of data in a single data stream comprising the steps of:

generating digital data for insertion into a data stream, said digital data including digital data representative of at least one of games and software;

generating a first type of data for insertion into said data stream;

generating a second type of data for insertion into said data stream;

combining said digital data with said fast type of data to form mixed data groups;

generating a header containing data from said second type of data;

combining said header with said mixed data groups to form a data frame; and constructing said data stream by joining a plurality of successive data frames for transmission.

2. The method of claim 1, wherein said first type of data comprises selection data which describes the attributes of said digital data.

3. The method of claim 1, wherein said second type of data includes subscriber control transaction data.

4. The method of claim 1, wherein said second type of data comprises selection data which describes the attributes of said digital data.

5. The method of claim 1, wherein said first type of data includes subscriber control transaction data.

6. Apparatus for communication different types of digital data to a receiver comprising:

first means for generating a first type of data for insertion into a data stream;

second means for generating a second type of data for insertion into said data stream;

third means for generating digital data for insertion into said data stream, said digital data including digital data representative of at least one of games and software;

means operatively associated with said first and third means for combining said digital data with said first type of data to form mixed data groups;

means operatively associated with said second means for generating a header containing data from said second type of data;

means for combining said header with a plurality of mixed data groups to form a data frame; and means for constructing said data stream by joining a plurality of successive data frames for transmission.

7. The apparatus of claim 6, wherein said first type of data comprises selection data which describes the attributes of said digital data.

8. The apparatus of claim 6, wherein said second type of data includes subscriber control transaction data.

9. The apparatus of claim 6, wherein said second type of data comprises selection data which describes the attributes of said digital data.

10. The apparatus of claim 6, wherein said first type of data includes subscriber control transaction data.

11. A digital data receiver for receiving a data stream containing successive headers including data of a first type, with each header followed by a plurality of mixed data groups including digital data and data of a second type, said receiver comprising:

first means for detecting data of the second type from successive mixed data groups contained in a received data stream;

second means for detecting data of the first type from successive headers contained in the received data stream;

means responsive to the detected data of the first type and the detected data of the second type for recovering the digital data from the received data stream, the digital data including digital data representative of at least one of games and software; and means for reproducing a program from the recovered digital data.

12. The digital data receiver according to claim 11, wherein said first type of data comprises selection data which describes the attributes of said digital data.

13. The digital data receiver according to claim 11, wherein said second type of data includes subscriber control transaction data.

14. The digital data receiver according to claim 11, wherein said second type of data comprises selection data which describes the attributes of said digital data.

15. The digital receiver according to claim 11, wherein said first type of data includes subscriber control transaction data.

* * * * *